United States Patent Office 3,689,465
Patented Sept. 5, 1972

3,689,465
SULFUR-CONTAINING POLYAMIDE
Stanley D. Turk, Bartlesville, Okla., assignor to
Phillips Petroleum Company
No Drawing. Filed July 17, 1967, Ser. No. 653,660
Int. Cl. C08g 20/04
U.S. Cl. 260—78 A                    8 Claims

ABSTRACT OF THE DISCLOSURE

A novel sulfur-containing polyamide has the repeating units $$\{NR'-R-S-R-CO\}$$

wherein each R is a saturated aliphatic or aromatic radical having up to 8 carbon atoms and R' is hydrogen, phenyl or a saturated aliphatic radical having up to 6 carbon atoms. The sulfur-containing polyamides of the invention are useful for conversion into fibers, films, formed objects, and coatings.

BACKGROUND OF THE INVENTION

This invention relates to a novel sulfur-containing polyamide resin.

A number of polyamide resins containing sulfur have been made in the prior art. Depending upon the method of formation, these polymers will have different repeating structural units. For example, the prior art has disclosed polymers having repeating units such as:

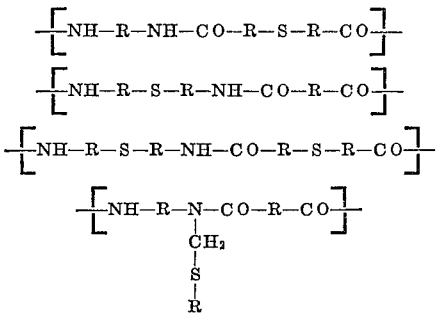

SUMMARY OF THE INVENTION

My invention is a novel polymer having a different structural unit represented by $\{NR'-R-S-R-CO\}$. In such repeating units, R is a saturated aliphatic or aromatic radical having up to 8 carbon atoms; R' is hydrogen, a phenyl radical, or a saturated aliphatic radical having up to 6 carbon atoms. It is preferred that there be at least 5 atoms, including the sulfur atom in the shortest chain separating the nitrogen atom and the carbon of the carbonyl group. In the most preferred embodiment of my invention, each R group is a saturated aliphatic radical having up to 4 carbon atoms, and each R' group is either hydrogen or a methyl radical.

DESCRIPTION OF THE PREFERRED EMBODIMENTS

The preparation of the novel sulfur-containing polyamide of my invention is carried out by the use of procedures which are conventional in the polyamide art. In the preferred embodiment, the polymer is formed by the amidation reaction of a monomer having the general formula

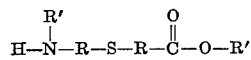

wherein R and R' are as described above and there are at least 5 atoms, including the sulfur atom, in the shortest chain separating the nitrogen atom and the carbon of the carbonyl group.

Preparation of the polymer is conveniently conducted by subjecting the sulfur-containing monomer to a temperature in the range of about 180° C. to about 220° C. for a sufficient time to complete the amidation reaction. A diluent is not generally necessary. A hydroxy compound such as water or an alcohol is a product of the polymerization reaction and its removal from the polymerization mixture can be assisted by passing a flow of an inert gas such as nitrogen through the reaction mixture. At the completion of the reaction, the last traces of water or alcohol can be removed by applying a vacuum to the polymerization mixture.

Some specific examples of the monomers for the polymerization reaction are 7-amino-4-thiaheptanoic acid
6-amino-4-thiahexanoic acid
6-methylamino-3-thiahexanoic acid
7-ethylamino-4-thiaheptanoic acid
methyl 8-amino-5-thiaoctanoate
7-phenylamino-5-thiaheptanoic acid
8-amino-6-thiaoctanoic acid
7-amino-4-ethyl-6-thiaheptanoic acid
methyl 7-methylamino-5-thiaheptanoate
9-amino-6-thianonanoic acid
8-amino-4-thiaoctanoic acid
hexyl 9-amino-4-thianonanoate
4-[(4-aminophenyl)thiobenzoic acid
3-[(2,3-dimethyl-4-aminophenyl)thiopropionic acid
5-phenyl-6-amino-4-thiahexanoic acid
4-(3-aminocyclopentyl)thiobutyric acid
18-amino-10-thiaoctadecanoic acid.

These monomers can be prepared by any one of several known methods. In one method, a mercaptan-substituted carboxylic acid, exemplified by thioglycolic acid, is added to an unsaturated amine, exemplified by allylamine, under free radical conditions such as that produced by the use of ultraviolet light, or free radical catalytic agents such as peroxides, or α,α'-azodiisobutyronitrile (AIBN). The general procedure for such a reaction is known and described, for example, in U.S. Pat. No. 3,257,301.

Still another method for the amino acid preparation is the reaction of an ester of a mercapto-substituted carboxylic acid, exemplified by the methyl ester of 3-mercaptopropionic acid, with ethylene imine. The procedure for this general type of condensation reaction is known and comprises, essentially, contacting the mercapto compound with an equimolar quantity of ethylene imine at elevated temperatures followed by hydrolysis.

The novel polymers of my invention can be liquid, semisolid, or solid, depending upon the particular monomer used and the conditions of reaction. The preparation of the novel polyamides from the specific sulfur-containing monomers of the present invention is carried out using, in general, the same technology applicable for known polyamides. Thus, conventional techniques in regard to amidation apparatus, materials handling, reactor control means, etc., can be used.

The polymers of my invention are generally substantially lower in molecular weight than the corresponding conventional polyamides. The solid polymers of my invention have a maximum inherent viscosity of about 0.7 when measured in m-cresol at 30° C., as compared to an inherent viscosity of about 1.0 for the corresponding conventional polyamides.

The sulfur-containing polyamides of my invention are useful for conversion into fibers, films, formed objects, and coatings. In addition, such polymeric compounds are useful when incorporated, in relatively small quantities, into other polymers such as polyethylene, polypropylene, and other non-sulfur-containing polyamides. When used in such small quantities in other polymers, the sulfur-containing polyamides of the present invention have been shown to increase the oxidation stability of the host polymer. The use of these polymers as oxidation inhibitors in other polymers is a separate invention by Williams, Turk and Edmonds being claimed in Ser. No. 665,276, filed Sept. 5, 1967, now abandoned.

EXAMPLE I

The 7-amino-4-thiaheptanoic acid which was used as the starting material to form a polymer of my invention was prepared as follows. A mixture of 3-mercaptopropionic acid (636 g., 6 moles), allyl amine (342.6 g., 6 moles), and deionized water (3000 ml.) was stirred and irradiated with a 450-watt Hanovia U.V. lamp at 30–56° C. for 32 minutes. The reactor was a 5-liter Morton flask modified with an internal cooling coil and a quartz thimble for the lamp. After concentrating the reaction mixture to dryness, the 1142 g. solid residue was recrystalized from a mixture of 2430 g. ethanol and 170 g. water, affording a pale yellow-crystaline product. A second recrystallization from 3150 g. of a 13:87 water-ethanol mixture, together with treatment with a little decolorizing charcoal, gave 643.5 g. (for a total of 66% yield) of 7-amino-4-thiaheptanoic acid as a white solid which melted at 168–169° C.

The above prepared compound was subjected to elemental analysis with the following results, in weight percent.

| Element: | Calculated | Found |
|---|---|---|
| C | 44.1 | 44.2 |
| H | 8.0 | 8.1 |
| N | 8.6 | 8.5 |
| O | 19.7 | 20.2 |
| S | 19.6 | 19.6 |

EXAMPLE II

A 23 g. quantity of 7-amino-4-thiaheptanoic acid prepared in Example I was placed in a polymer tube which was then evacuated and purged with high purity nitrogen several times. The tube was heated in an oil bath at 189–204° C. for 6 hours while nitrogen was slowly bubbled through the melt. Heating at 204° C. was then continued under high vacuum for 1 hour. The melt became viscous and developed a pale yellow color. When cooled, the polymer, poly-(propylmercaptopropionamide), was a hard, brittle, off-white, opaque solid which melted at 180° C. (hot wire) and had an inherent viscosity of 0.54 (in metacresol).

Reasonable variation and modification are permissible within the scope of this invention disclosure and the appending claims without departing from the spirit of my invention.

I claim:

1. A solid sulfur-containing polyamide consisting essentially of repeating units of the formula

—NR′—R—S—R—CO— wherein each R is a saturated aliphatic hydrocarbon radical having up to 4 carbon atoms and R′ is a hydrogen or a methyl group.

2. The polyamide of claim 1 wherein there are at least 5 atoms in tne chain between the nitrogen and the carbon of the carbonyl group.

3. A solid polyamide consisting essentially of repeating units of the formula:

—NH—CO—CH$_2$—CH$_2$—S—CH$_2$—CH$_2$—CH$_2$.

References Cited

UNITED STATES PATENTS 2,312,966   3/1943   Hanford _____ 260—78
2,688,011   8/1954   Wheatley et al. _____ 260—78

HAROLD D. ANDERSON, Primary Examiner

U.S. Cl. X.R.

117—161 PA; 260—33.4 R, 561 S, 562 S, 857 UN